United States Patent
Walls, Jr.

(10) Patent No.: US 10,655,903 B2
(45) Date of Patent: May 19, 2020

(54) FRONT OPENING FREEZER CHEST

(71) Applicant: Ernest Walls, Jr., Cleveland, GA (US)

(72) Inventor: Ernest Walls, Jr., Cleveland, GA (US)

( * ) Notice: Subject to any disclaimer, the term of this patent is extended or adjusted under 35 U.S.C. 154(b) by 0 days.

(21) Appl. No.: 16/136,446

(22) Filed: Sep. 20, 2018

(65) Prior Publication Data

US 2020/0096250 A1    Mar. 26, 2020

(51) Int. Cl.
*F25D 11/04* (2006.01)
*F25D 25/02* (2006.01)
*A47J 47/00* (2006.01)
*F25D 11/00* (2006.01)
*E06B 5/00* (2006.01)
*F25D 23/06* (2006.01)

(52) U.S. Cl.
CPC ............. *F25D 11/04* (2013.01); *A47J 47/005* (2013.01); *E06B 5/00* (2013.01); *F25D 11/00* (2013.01); *F25D 23/069* (2013.01); *F25D 25/022* (2013.01)

(58) Field of Classification Search
CPC .......... F25D 11/00; F25D 11/04; F25D 23/06; F25D 23/065; F25D 25/022; F25D 25/025; F25D 2400/06; F25D 2400/08
See application file for complete search history.

(56) References Cited

U.S. PATENT DOCUMENTS

| | | | | |
|---|---|---|---|---|
| 2,432,042 A * | 12/1947 | Richard | .............. | F25D 11/04 62/273 |
| 2,490,494 A * | 12/1949 | Widman | .............. | F25D 25/00 312/301 |
| 2,786,337 A * | 3/1957 | Spring | .............. | F25D 23/12 232/43.2 |
| 4,285,391 A * | 8/1981 | Bourner | .............. | F25D 31/005 165/61 |
| 4,400,951 A | 8/1983 | Cherry | | |
| 4,457,140 A | 7/1984 | Rastelli | | |
| 5,044,704 A * | 9/1991 | Bussan | .............. | F25D 25/025 312/402 |
| 5,117,649 A | 6/1992 | Mangini | | |
| 5,415,010 A | 5/1995 | Woo | | |
| 6,708,509 B1 * | 3/2004 | Senner | .............. | F25C 5/005 62/137 |
| 7,334,851 B2 * | 2/2008 | Rose | .............. | F25D 23/026 312/116 |
| 8,002,369 B2 * | 8/2011 | Bello | .............. | F25D 25/025 312/410 |
| 8,975,780 B2 * | 3/2015 | Urban | .............. | H02J 9/06 307/64 |

(Continued)

*Primary Examiner* — Andrew M Roersma

(57) ABSTRACT

A front opening freezer chest for easy storage and access includes a chest housing having a bottom side, a top side, a left side, a right side, a back side, and a front side. A median wall divides an inside of the chest housing into a left compartment and a right compartment. A pair of doors is swingably coupled to the chest housing and covers the front side in a closed position and alternatively exposes the front side in an open position. A plurality of basket systems is slidably coupled within each of the left compartment and the right compartment. A plurality of supports coupled is coupled to the bottom side of the chest housing and is configured to elevate the chest housing from the floor. A refrigeration system is coupled within the inside of the chest housing and has a power cord extending through the back side.

1 Claim, 5 Drawing Sheets

(56) References Cited

U.S. PATENT DOCUMENTS

| | | | |
|---|---|---|---|
| 9,157,674 B2 | 10/2015 | Collins | |
| 2005/0279122 A1* | 12/2005 | Cohen | F25D 11/00 62/441 |
| 2009/0158754 A1* | 6/2009 | Li | F25D 17/065 62/62 |
| 2010/0205992 A1* | 8/2010 | Morris | F25D 25/025 62/246 |
| 2016/0290705 A1* | 10/2016 | Jenkinson | F25D 25/02 |
| 2017/0191742 A1* | 7/2017 | Lim | A47B 88/407 |
| 2017/0227280 A1* | 8/2017 | Yang | F25D 25/025 |
| 2017/0366042 A1* | 12/2017 | Watts | H02J 9/061 |

\* cited by examiner

FRONT OPENING FREEZER CHEST

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to freezer chests and more particularly pertains to a new freezer chest for easy storage and access.

BRIEF SUMMARY OF THE INVENTION

An embodiment of the disclosure meets the needs presented above by generally comprising a chest housing having a bottom side separated from a top side, a left side separated from a right side, and a back side separated from a front side. The front side has a pair of apertures extending through to an inside of the chest housing and a median wall extends from the front side between the pair of apertures to the back side, dividing the inside into a left compartment and a right compartment. A pair of doors comprises a left door having a first pair of hinges coupled to the left side of the chest housing adjacent the front side and a right door having a second pair of hinges coupled to the right side of the housing adjacent the front side. Each of the pair of doors is swingably coupled to the chest housing and covers the front side in a closed position and alternatively exposes the front side in an open position. A plurality of basket systems is slidably coupled within each of the left compartment and the right compartment. Each of the plurality of basket systems has a stored position fully within the inside of the chest housing and an alternate extended position extending past the front side. A plurality of supports coupled is coupled to the bottom side of the chest housing and is configured to elevate the chest housing from the floor. A refrigeration system is coupled within the inside of the chest housing and has a power cord extending through the back side.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
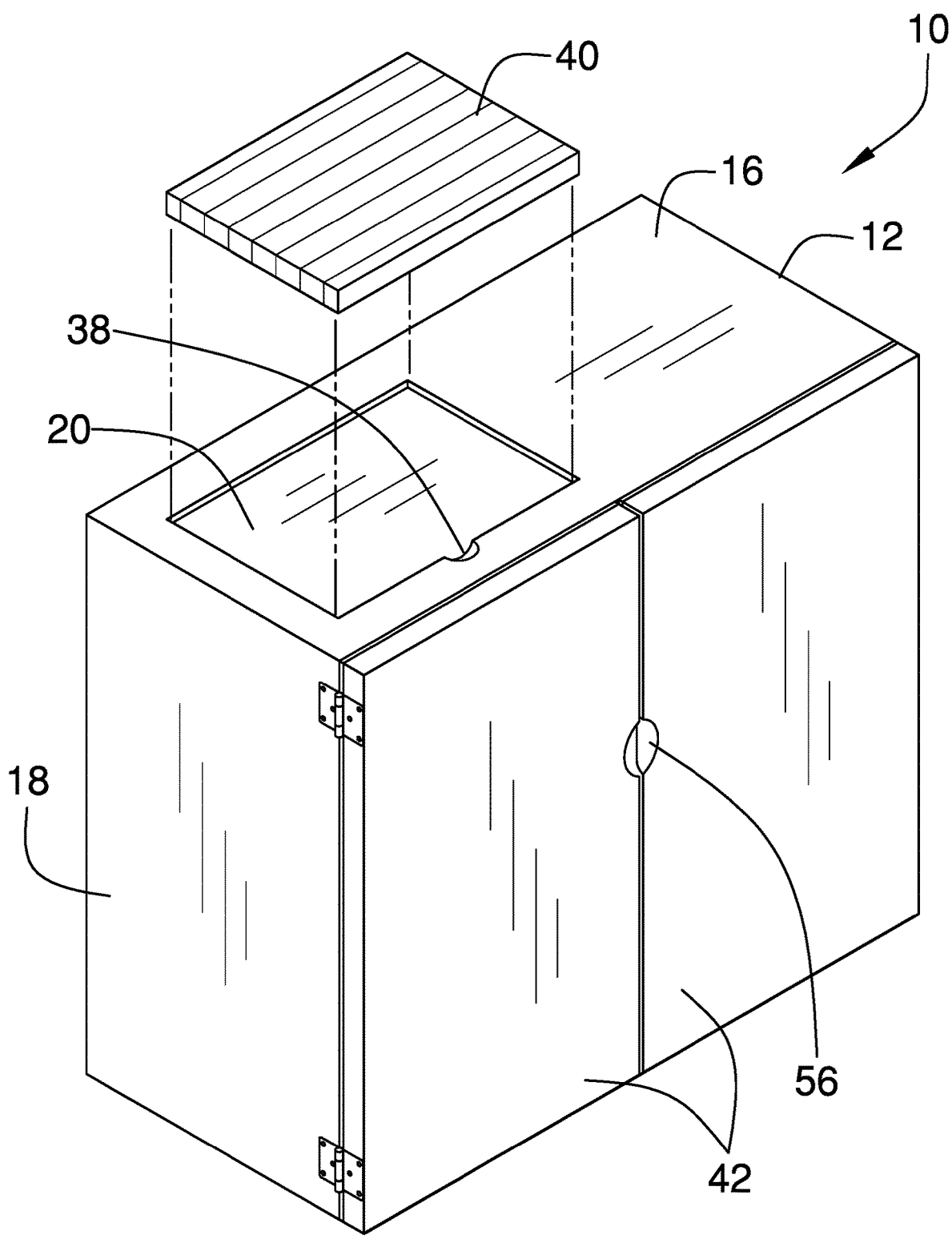
FIG. 1 is an isometric view of a front opening freezer chest according to an embodiment of the disclosure.
Figure 2:
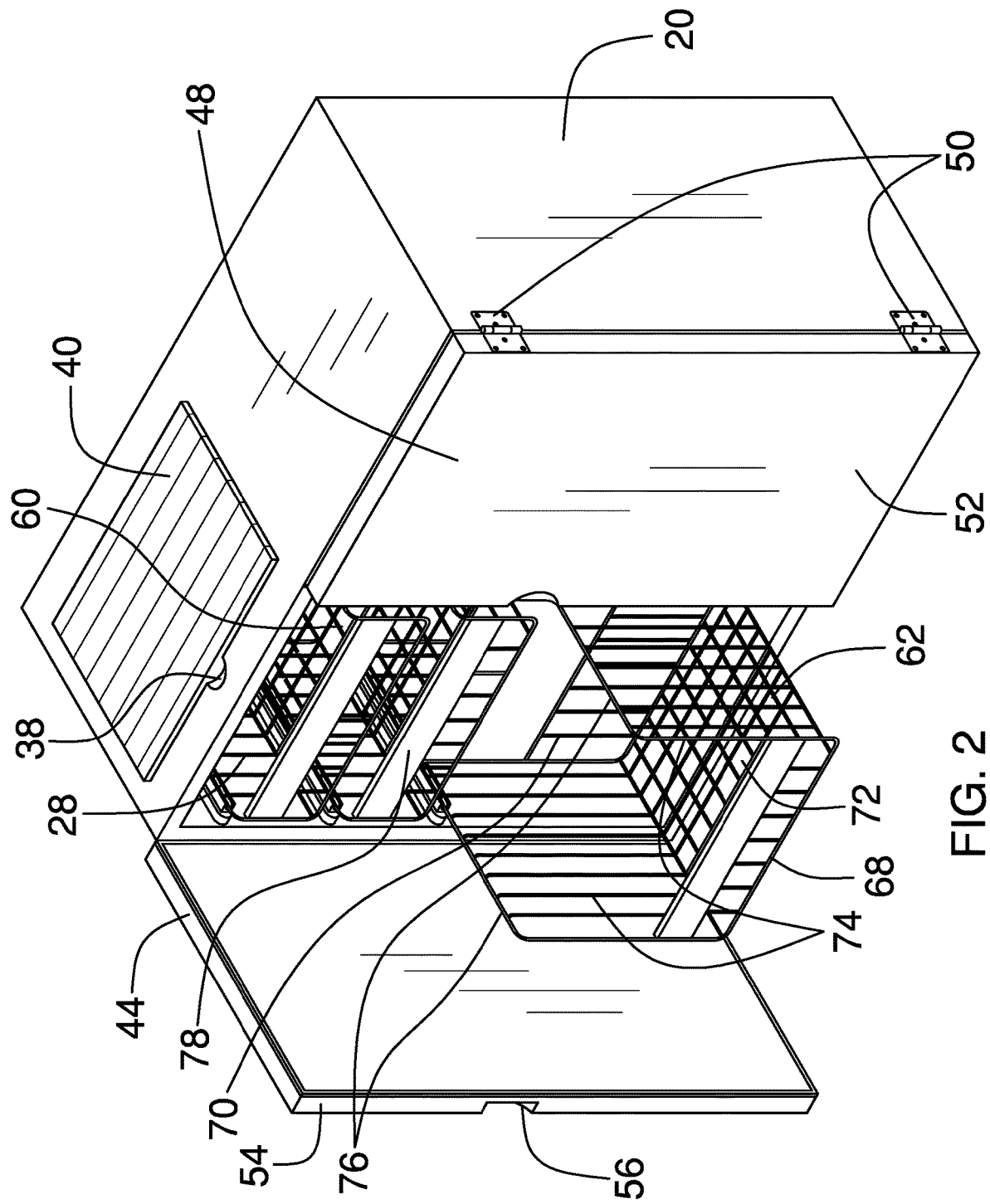
FIG. 2 is an isometric view of an embodiment of the disclosure.
Figure 3:
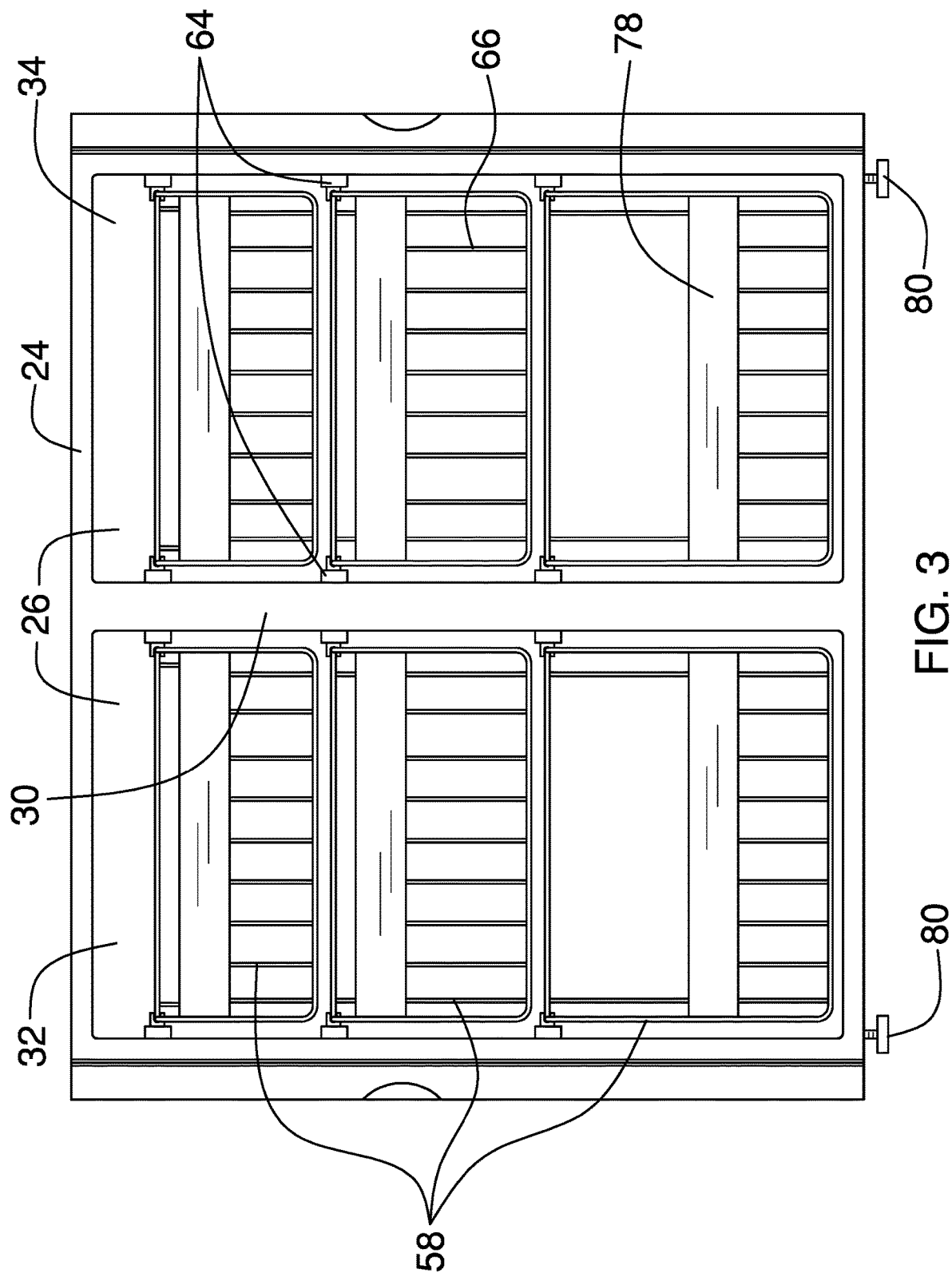
FIG. 3 is a front elevation view of an embodiment of the disclosure.
Figure 4:
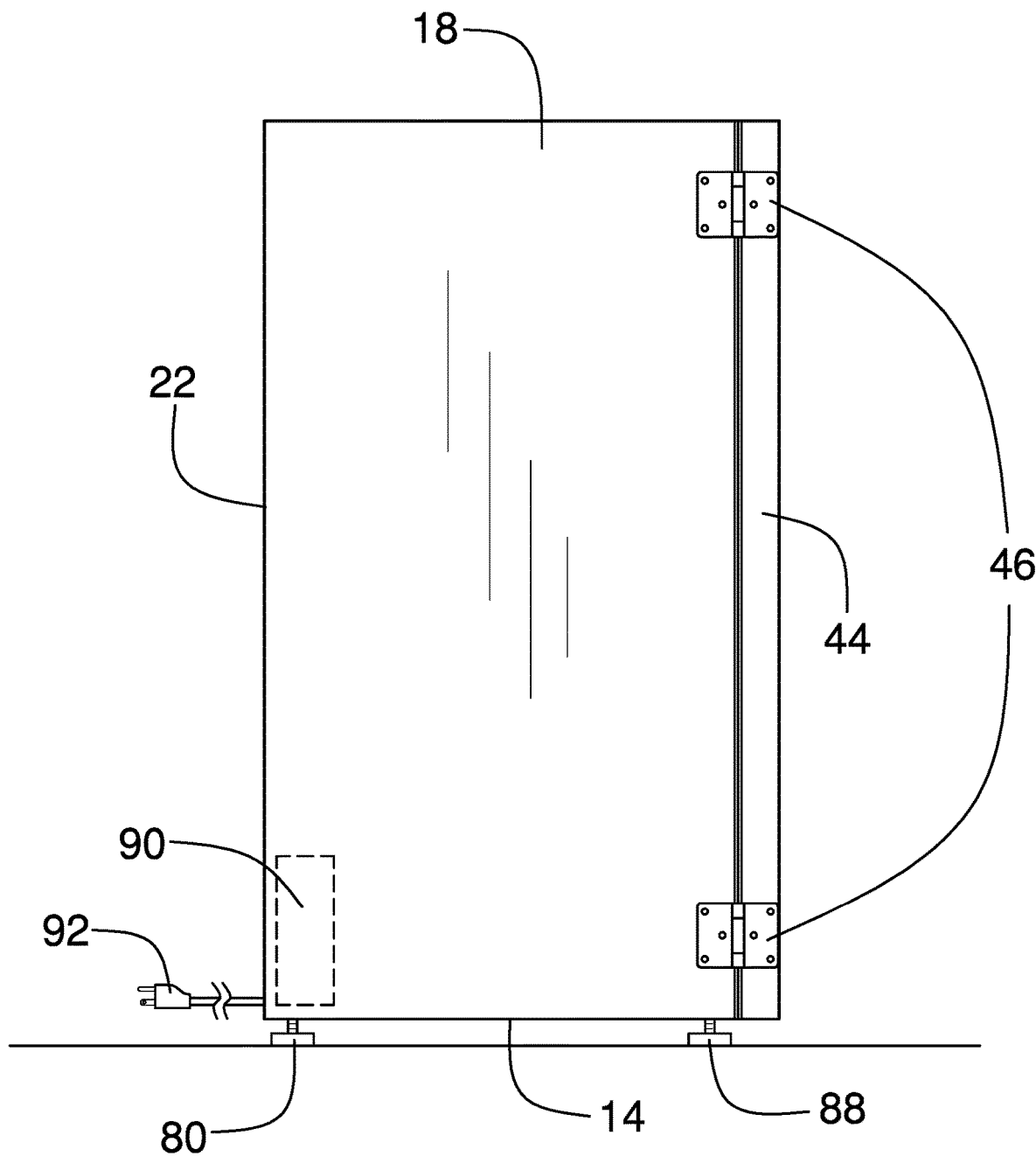
FIG. 4 is a side elevation view of an embodiment of the disclosure.
Figure 5:
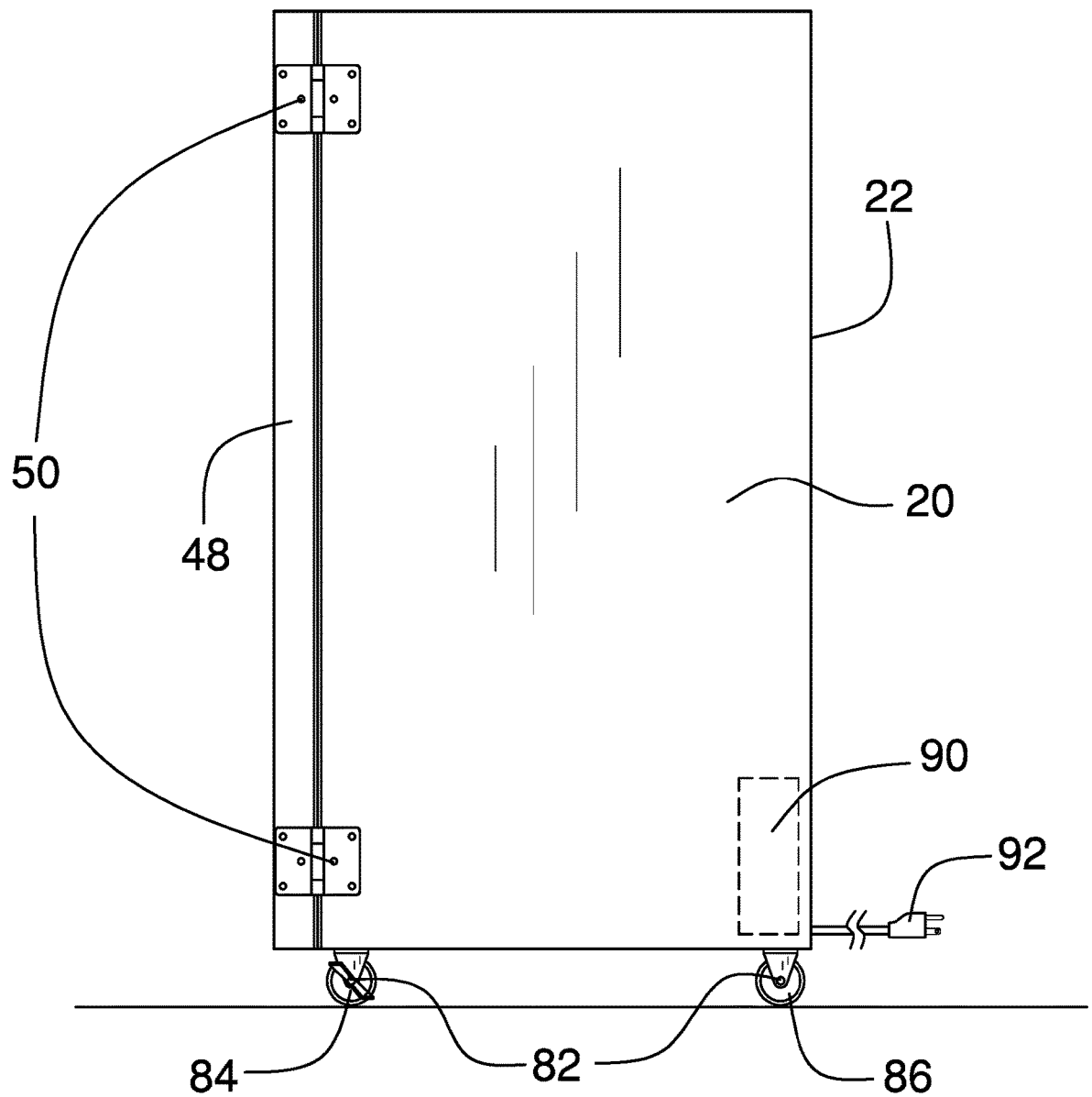
FIG. 5 is a side elevation view of an embodiment of the disclosure.

With reference now to the drawings, and in particular to FIGS. 1 through 5 thereof, a new freezer chest embodying the principles and concepts of an embodiment of the disclosure and generally designated by the reference numeral 10 will be described.

As best illustrated in FIGS. 1 through 5, the front opening freezer chest 10 generally comprises a chest housing 12 having a bottom side 14 separated from a top side 16, a left side 18 separated from a right side 20, and a back side 22 separated from a front side 24. The front side 24 has a pair of apertures 26 extending through to an inside 28 of the chest housing. A median wall 30 extends from the front side 24 between the pair of apertures 26 to the back side 22 and divides the inside 28 into a left compartment 32 and a right compartment 34. The top side 16 may have a surface depression 36 having a notch 38. A surface insert 40 is removably coupled within the surface depression 36 with the notch 38 providing a place for a user to get leverage and remove the surface insert 40. The surface insert 40 may being a cutting board.

A pair of doors 42 comprises a left door 44 having a first pair of hinges 46 coupled to the left side 18 of the chest housing adjacent the front side 24 and a right door 48 having a second pair of hinges 50 coupled to the right side 20 of the housing adjacent the front side 24. Each of the pair of doors 42 is swingably coupled to the chest housing 12 and has a closed position 52 and an alternate open position 54. The pair of doors 42 covers the front side 24 in the closed position to seal the left compartment 32 and the right compartment 34 and alternatively exposes the front side 24 in the open position 54 to provide access to the inside 28 of the chest body. Each of the pair of doors 42 has a handle recession 56. A plurality of basket systems 58 is slidably coupled within each of the left compartment 32 and the right compartment 34. Each of the plurality of basket systems 58 has a stored position 60 fully within the inside 28 of the chest housing and an alternate extended position 62 extending past the front side 24. Each of the plurality of basket systems 58 may comprise a pair of tracks 64 and a basket 66. The pair of tracks 64 is coupled to the left side 18 and the median wall 30 within the left compartment 32 or the right side 20 and the median wall 30 within the right compartment 34. The basket 66 comprises a front wall 68, a back wall 70, a bottom floor 72, and a pair of side walls 74 each having a top edge 76. The top edge 76 of each of the pair of side walls is slidable within the pair of tracks 64 to move the basket 66 to and from the stored position 60 and the extended position 62. Each of the front wall 68, the back wall 70, the bottom floor 72, and the pair of side walls 74 may be a wire frame with the front wall 68 having a solid pull bar 78.

A plurality of supports 80 is coupled to the bottom side 14 of the chest housing to elevate the chest housing 12 from the floor. The plurality of supports 80 may be a plurality of wheels 82 comprising a pair of front wheels 84 and a pair of rear wheels 86. Each of the pair of front wheels 82 is lockable to prevent the front opening freezer chest 10 from moving. The plurality of supports 80 may alternatively be a plurality of adjustable feet 88. A refrigeration system 90 is coupled within the inside 28 of the chest housing and has a power cord 92 extending through the back side 22.

In use, the front opening freezer chest 10 is used to store food in the same manner as a traditional freezer chest but utilizes the plurality of basket systems 58 and the pair of doors 42 to improve organization and ease of access of stored items. The top side 16 of the chest housing can be fully utilized, allowing the front opening freezer chest 10 to serve as extra counter space or a kitchen island.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A front opening freezer chest comprising:

a chest housing having a bottom side separated from a top side, a left side separated from a right side, and a back side separated from a front side, the front side having a pair of apertures extending through to an inside of the chest housing, a median wall extending from the front side between the pair of apertures to the back side, the median wall dividing the inside into a left compartment and a right compartment, the top side having a surface depression, the surface depression having a notch;

a surface insert coupled to the chest housing, the surface insert being removably coupled within the surface depression of the top side of the chest housing, the surface insert being a cutting board;

a pair of doors coupled to the chest housing, the pair of doors comprising a left door having a first pair of hinges coupled to the left side of the chest housing adjacent the front side and a right door having a second pair of hinges coupled to the right side of the housing adjacent the front side, each of the pair of doors being swingably coupled to the chest housing and having a closed position and an alternate open position, the pair of doors covering the front side in the closed position and alternatively exposing the front side in the open position, each of the pair of doors having a handle recession;

a plurality of basket systems coupled to the chest housing, the plurality of basket systems being slidably coupled within each of the left compartment and the right compartment, each of the plurality of basket systems having a stored position fully within the inside of the chest housing and an alternate extended position extending past the front side, each of the plurality of basket systems comprising a pair of tracks and a basket, the pair of tracks being coupled to the left side and the median wall or the right side and the median wall, the basket comprising a front wall, a back wall, a bottom floor, and a pair of side walls having a top edge, the top edge of each of the pair of side walls being slidable within the pair of tracks, each of the front wall, the back wall, the bottom floor, and the pair of side walls being a wire frame, the front wall having a solid pull bar;

a plurality of supports coupled to the chest housing, the plurality of supports being coupled to the bottom side being configured to elevate the chest housing from the floor, the plurality of supports being a plurality of wheels comprising a pair of front wheels and a pair of rear wheels, wherein each of the pair of front wheels is lockable; and a refrigeration system coupled to the chest housing, the refrigeration system being coupled within the inside of the chest housing and having a power cord extending through the back side.

\* \* \* \* \*